(12) United States Patent
Burton et al.

(10) Patent No.: US 11,372,743 B2
(45) Date of Patent: Jun. 28, 2022

(54) COMPUTER DEVICES AND COMPUTER IMPLEMENTED METHODS

(71) Applicant: KING.COM LIMITED, St. Julians (MT)

(72) Inventors: Mathieu Burton, Stockholm (SE); Bjorn Larsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 53 days.

(21) Appl. No.: 16/916,797

(22) Filed: Jun. 30, 2020

(65) Prior Publication Data

US 2021/0406153 A1    Dec. 30, 2021

(51) Int. Cl.

| G06F 9/44 | (2018.01) |
| G06F 11/36 | (2006.01) |
| G06F 11/34 | (2006.01) |
| G06F 11/32 | (2006.01) |

(52) U.S. Cl.
CPC ........ *G06F 11/3636* (2013.01); *G06F 11/328* (2013.01); *G06F 11/3438* (2013.01); *G06F 11/3466* (2013.01)

(58) Field of Classification Search
None
See application file for complete search history.

(56) References Cited

U.S. PATENT DOCUMENTS

| 8,954,935 | B2 * | 2/2015 | Kew | ................... | G06F 11/3636 |
| | | | | | 717/130 |
| 2011/0157001 | A1 * | 6/2011 | Bose | ..................... | G06F 3/1462 |
| | | | | | 345/156 |
| 2014/0282430 | A1 * | 9/2014 | Kew | ................... | G06F 11/3636 |
| | | | | | 717/130 |
| 2017/0187604 | A1 * | 6/2017 | Dixon | ................. | G06F 11/3616 |

* cited by examiner

*Primary Examiner* — Qamrun Nahar
(74) *Attorney, Agent, or Firm* — Saul Ewing Arnstein & Lehr LLP

(57) ABSTRACT

A computer device processes frame data provided by running of a computer app, the frame data comprising a plurality of events occurring in the computer ap. A display displays information associated with one or more frames of the plurality of frames. At least one processor of the computer device determines a node graph, in response to input from a user, for one or more events associated with one or more frames from the frame data and that node graph is displayed.

27 Claims, 11 Drawing Sheets

COMPUTER DEVICES AND COMPUTER IMPLEMENTED METHODS

FIELD OF THE INVENTION

Some embodiments may relate to a computer device and computer implemented method for processing frame data provided by a computer app.

BACKGROUND OF THE INVENTION

To provide a computer app or computer program may require very many lines of computer code. When designing or modifying a computer app, errors and/or inconsistencies and/or problems in the computer code may cause the app not to work or to not work in an expected way.

One way of debugging of the computer code to determine the cause of the error etc. may be the study many lines of computer code.

SUMMARY OF THE INVENTION

According to an aspect there is provided a computer device comprising: at least one processor configured to process frame data for a plurality of frames provided by running of a computer app, the frame data comprising a plurality of events occurring in the computer app; a display configured to display information associated with one or more frames of the plurality of frames; and a user interface configured to receive input from a user; the at least one processor being configured to: determine a node graph, in response to the input from the user, for one or more events associated with one or more frames, from the frame data; and cause the display to display the determined node graph associated with the one or more events.

The user interface may be configured to receive the input from the user selecting the one or more events for which the node graph is determined.

The at least one processor may be configured to cause the display to display a user selectable area associated with a respective event, the input from the user selecting respective selectable areas associated with the one or more events The computer device may comprise a data input configured to receive the frame data provided by the computer app as the computer app is running.

The frame data may be received substantially in real time.

The computer device may comprise at least one memory configured to store at least a part of the frame data provided by the computer app.

The node graph may comprise a first node associated with one of the one or more events and one or more further nodes which are connected to the first node.

The user interface may be configured to receive user input associated with a connection between the first node and a further node which is connected to the first node and in response the at least one processor may be configured to cause information about the connection to be displayed on the display.

The at least one processor may be configured to determine history information associated with the connection, the information about the connection comprising the determined history information.

The user interface may be configured to receive user input setting one or more filters and the at least one processor may be configured to process the frame data in dependence on the one or more filters to cause the display to display data satisfying the one or more filters.

The user interface may be configured to receive user input setting one or more event filters and the at least one processor may be configured to process the frame data in dependence on the filters to cause the display to display information about one or more of: events satisfying the one or more filters or one or more frames containing events satisfying the one or more filters The at least one processor may be configured to cause the display to display a timeline of one or more frames.

The user interface may be configured to receive a user input to select one or more frames and in response, the at least one processor may be configured to cause the display to display information about one or more events associated with the selected one or more frames.

The user interface may be configured to receive a user input to select one or more frames of the timeline and in response, the at least one processor may be configured to determine a node graph for one or more events associated with the selected one or more frames of the timeline.

The computer device may comprise a data input configured to receive the frame data provided by the computer app as the computer app is running, and the at least one processor may be configured to update the timeline as the data provided by the computer app is received and to cause the display to display the updated timeline.

The frame data provided by the computer app may be provided substantially in real time.

The user interface may be configured to receive user input setting one or more filters and the at least one processor may be configured to process the frame data in dependence on the one or more filters to cause the display to display in the timeline, one or more frames satisfying the one or more filters.

The at least one processor may be configured to determine data for a respective frame and cause the display to display the data in association with the respective frame in the timeline.

The data determined for a respective frame may comprise processing time data for that respective frame.

The data determined for a respective frame may comprise one or more of number of port changes for the respective frame, number of events for the respective frame and number of data changes for the respective frame.

The user interface may be configured to receive user input providing breakpoint data, the at least one processor may be configured to provide an output which causes a breakpoint condition to be set for the computer app, wherein when the breakpoint is satisfied, the computer app will pause.

The breakpoint data may define at least one of an entity of the computer app and a port of the entity of the computer app.

The user interface may be configured to receive user input defining a value for a first port of a first entity, and the at least one processor may be configured in response to provide an output which causes the value to be inserted into the first port of the first entity of the computer app.

The user interface may be configured to receive an input to connect to a host on which the computer app is run and in response the at least one processor may be configured to provide an output to the host to cause the computer app to run.

The user interface may be configured to receive an input to pause the computer app and in response the at least one processor may be configured to cause an output to be provided to a host on which the computer app is run to cause the computer app to be paused.

While the computer app is paused, the user interface may be configured to receive a step frame input, and in response to the step frame input, the at least one processor may be configured to provide an output to the host which causes the computer app to run to provide data for a next frame before pausing again.

According to another aspect there is provided a computer method performed by a computer device comprising: processing frame data, by at least one processor of the computer device, for a plurality of frames provided by running of a computer app, the frame data comprising a plurality of events occurring in the computer app; displaying, by a display of the computer device, information associated with one or more frames of the plurality of frames; receiving, by a user interface of the computer device, input from a user; determining, by the at least one processor, a node graph, in response to the input from the user, for one or more events associated with one or more frames from the frame data; and causing, by the at least one processor, the display to display the determined node graph associated with the one or more events.

The method may comprise receiving input from the user selecting the one or more events for which the node graph is determined.

The method may comprise causing, by the at least one processor, the display to display a user selectable area associated with a respective event, the input from the user selecting respective selectable areas associated with the one or more events The method may comprise receiving, via a data input of the computer device, the frame data provided by the computer app as the computer app is running.

The frame data may be received substantially in real time.

The method may comprise storing, by at least one memory of the computer device, at least a part of the frame data provided by the computer app.

The node graph may comprise a first node associated with one of the one or more events and one or more further nodes which are connected to the first node.

The method may comprise receiving user input associated with a connection between the first node and a further node which is connected to the first node and in response, causing by the at least one processor, information about the connection to be displayed on the display.

The method may comprise determining, by the at least one processor history information associated with the connection, the information about the connection comprising the determined history information.

The method may comprise receiving user input setting one or more filters and processing, by the at least one processor, the frame data in dependence on the one or more filters to cause the display to display data satisfying the one or more filters.

The method may comprise receiving user input setting one or more event filters and processing, by the at least one processor, the frame data in dependence on the filters to cause the display to display information about one or more of: events satisfying the one or more filters or one or more frames containing events satisfying the one or more filters The method may comprise causing, by the at least one processor, the display to display a timeline of one or more frames.

The method may comprise receiving a user input to select one or more frames and in response, the at least one processor may be configured to cause the display to display information about one or more events associated with the selected one or more frames.

The method may comprise receiving, by a data input, the frame data provided by the computer app as the computer app is running, and updating, by the at least one processor the timeline as the data provided by the computer app is received and to causing the display to display the updated timeline.

The frame data provided by the computer app may be provided substantially in real time.

The method may comprise receiving a user input to select one or more frames of the timeline and in response, determining by the at least one processor, a node graph for one or more events associated with the selected one or more frames of the timeline.

The method may comprise receiving user input setting one or more filters and processing, by the at least one processor, the frame data in dependence on the one or more filters to cause the display to display in the timeline, one or more frames satisfying the one or more filters.

The method may comprise determining, by the at least one processor, data for a respective frame and causing the display to display the data in association with the respective frame in the timeline.

The data determined for a respective frame may comprise processing time data for that respective frame.

The data determined for a respective frame may comprise one or more of number of port changes for the respective frame, number of events for the respective frame and number of data changes for the respective frame.

The method may comprise receiving user input providing breakpoint data, and providing, by the at least one processor, an output which causes a breakpoint condition to be set for the computer app, wherein when the breakpoint is satisfied, the computer app will pause.

The breakpoint data may define at least one of an entity of the computer app and a port of the entity of the computer app.

The method may comprise receiving user input defining a value for a first port of a first entity, and providing, by the at least one processor, in response an output which causes the value to be inserted into the first port of the first entity of the computer app.

The method may comprise receiving an input to connect to a host on which the computer app is running and in response providing, by the at least one processor, an output to the host to cause the computer app to run.

The method may comprise receiving an input to pause the computer app and in response providing, by the at least one processor, an output to be provided to a host on which the computer app is run to cause the computer app to be paused.

While the computer app is paused, the method may comprise receiving user interface may be configured to receive a step frame input, and in response to the step frame input, the at least one processor may be configured to provide an output to the host which causes the computer app to run to provide data for a next frame before pausing again.

According to another aspect, there is provided a computer device comprising: a data input configured to receive frame data provided by a computer app as the computer app is running, the frame data comprising a plurality of events occurring in the computer app; and at least one processor configured to: cause a display to display a timeline of one or more frames; update the timeline as the data provided by the computer app is received; and cause the display to display the updated timeline.

The computer device may comprise a user interface configured to receive input from a user.

The user interface may be configured to receive a user input to select one or more frames and in response, the at least one processor may be configured to display information about one or more events associated with the selected one or more frames.

The frame data provided by the computer app may be provided substantially in real time.

The user interface may be configured to receive user input setting one or more filters and the at least one processor may be configured to process the frame data in dependence on the one or more filters to cause the display to display in the timeline, one or more frames satisfying the one or more filters.

The at least one processor may be configured to determine data for a respective frame and cause the display to display the data in association with the respective frame in the timeline.

The data determined for a respective frame may comprise processing time data for that respective frame.

The data determined for a respective frame may comprise one or more of number of port changes for the respective frame, number of events for the respective frame and number of data changes for the respective frame.

The user interface may be configured to receive user input providing breakpoint data, the at least one processor may be configured to provide an output which causes a breakpoint condition to be set for the computer app, wherein when the breakpoint is satisfied, the computer app will pause.

The breakpoint data may define at least one of an entity of the computer app and a port of the entity of the computer app.

The user interface may be configured to receive user input defining a value for a first port of a first entity, and the at least one processor may be configured in response to provide an output which causes the value to be inserted into the first port of the first entity of the computer app.

The user interface may be configured to receive an input to connect to a host on which the computer app is run and in response the at least one processor may be configured to provide an output to the host to cause the computer app to run.

The user interface may be configured to receive an input to pause the computer app and in response the at least one processor may be configured to cause an output to be provided to a host on which the computer app is run to cause the computer app to be paused.

While the computer app is paused, the user interface may be configured to receive a step frame input, and in response to the step frame input, the at least one processor may be configured to provide an output to the host which causes the computer app to run to provide data for a next frame before pausing again.

According to another aspect there is provided a computer method performed by a computer device comprising: receiving, by a data input of the computer device, frame data provided by a computer app as the computer app is running, the frame data comprising a plurality of events occurring in the computer app; causing, by at least one processor of the computer device, a display to display a timeline of one or more frames; updating, by the at least one processor, the timeline as the data provided by the computer app is received; and causing, by the at least one processor, the display to display the updated timeline.

The method may comprise receiving user input via a user interface of the computer device.

The method may comprise receiving, via the user interface, a user input to select one or more frames and in response, method may comprise displaying, by the at least one processor, information about one or more events associated with the selected one or more frames.

The frame data provided by the computer app may be provided substantially in real time.

The method may comprise receiving, via the user interface, user input setting one or more filters and the method may comprise processing, by the at least one processor, the frame data in dependence on the one or more filters to cause the display to display in the timeline, one or more frames satisfying the one or more filters.

The method may comprise determining, by the at least one processor, data for a respective frame and causing the display to display the data in association with the respective frame in the timeline.

The data determined for a respective frame may comprise processing time data for that respective frame.

The data determined for a respective frame may comprise one or more of number of port changes for the respective frame, number of events for the respective frame and number of data changes for the respective frame.

The method may comprise receiving, via the user interface, user input providing breakpoint data, and providing, by the at least one processor, an output which causes a breakpoint condition to be set for the computer app, wherein when the breakpoint is satisfied, the computer app will pause.

The breakpoint data may define at least one of an entity of the computer app and a port of the entity of the computer app.

The method may comprise receiving, via the user interface, user input defining a value for a first port of a first entity, and in response providing, by the at least one processor, an output which causes the value to be inserted into the first port of the first entity of the computer app.

The method may comprise receiving, via the user interface, an input to connect to a host on which the computer app is run and in response providing, by the at least one processor an output to the host to cause the computer app to run.

The method may comprise receiving, via the user interface, an input to pause the computer app and in response the at least one processor may be configured to cause an output to be provided to a host on which the computer app is run to cause the computer app to be paused.

While the computer app is paused, the user interface may be configured to receive a step frame input, and in response to the step frame input, the at least one processor may be configured to provide an output to the host which causes the computer app to run to provide data for a next frame before pausing again.

According to another aspect, there is provided a computer device comprising:

at least one processor configured to process frame data for a plurality of frames provided by running of a computer app, the frame data comprising a plurality of events occurring in the computer app; a display configured to display information associated with one or more frames of the plurality of frames; and a user interface configured to receive input from a user selecting one or more events; the at least one processor being configured to: determine a node graph, in response to the input from the user, for the selected one or more events associated with one or more frames from the frame data; and cause the display to display the determined node graph associated with the selected one or more events.

According to some aspects, there is provided a program product comprising a computer-readable storage device including a computer-readable program for providing a computer-implemented method, wherein the computer-readable program when executed on a computer causes the computer to perform any one or more of the method steps described previously.

According to another aspect, there is provided a computer readable non-transitory storage medium carrying one or more computer executable instructions which when run on at least one processor cause:

A computer program comprising program code means adapted to perform the method(s) may also be provided. The computer program may be stored and/or otherwise embodied by means of a carrier medium.

It is an aim of some embodiments to provide a technical solution to the problem of debugging, designing and/or modifying a computer code.

In the above, many different embodiments have been described. It should be appreciated that further embodiments may be provided by the combination of any two or more of the embodiments described above.

In the above, embodiments have referred to a computer device. It should be appreciated that some embodiments may use two or more computer devices.

Various other aspects and further embodiments are also described in the following detailed description and in the attached claims.

BRIEF DESCRIPTION OF FIGURES

To understand some embodiments, reference will now be made by way of example only to the accompanying drawings, in which:

FIG. 10 schematically shows a breakpoint option provided for the node graph of FIG. 9a;

DETAILED DESCRIPTION OF THE INVENTION

Figure 1:
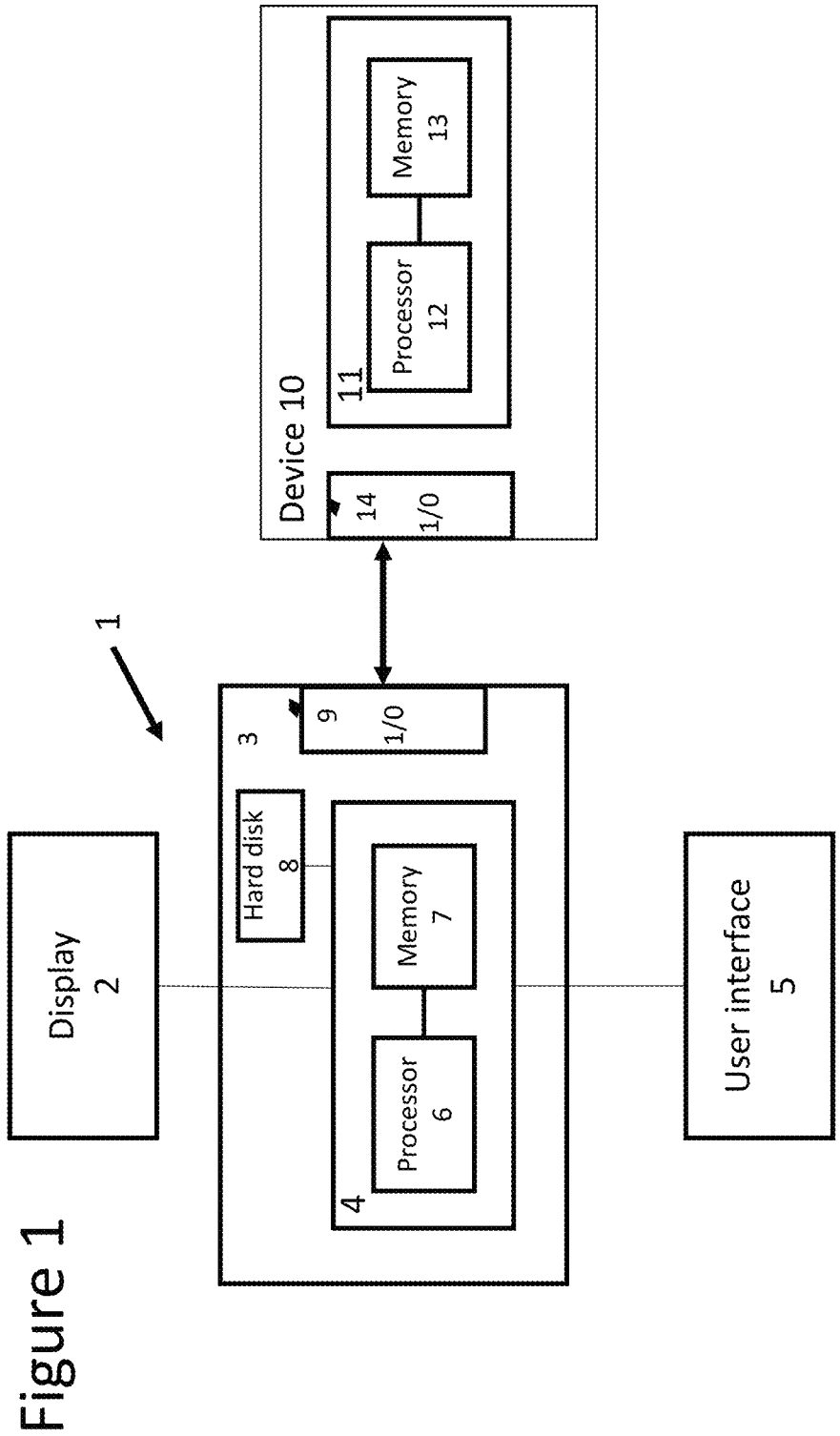
FIG. 1 shows a computing arrangement in which embodiments may be provided.

Reference is made to FIG. 1 which schematically shows a computing arrangement 1 in which embodiments may be provided. In this example, the computing arrangement may be a computing device, PC, laptop, server or the like. The computing arrangement comprises a computing part 3 which comprises a computer processing part 4. The computer processing part 4 may in some embodiments be provided at least partially by one or more CPUs (central processing unit). This computer processing part 3 may comprise one or more processors 6 along with one or more memories 7. The one or more memories 7 may comprise random access memory, in some embodiments.

The computing part 3 may have an input/output interface 9 which allows the computing arrangement 1 to be connected to a network and/or one or more other devices 10. The input/output interface 3 may be for a wired and/or wireless connection.

In this embodiment, a hard disk drive 8 or other similar data storage may be provided. In other embodiments, a hard disk drive or other data storage may alternatively or additionally be provided on a different device. The computing part 3 may be configured to access a different device 10 via the input/output interface 6. This may be directly or via a network or the like.

The computing arrangement 1 may have a display 2 coupled to the computing part 3. The display 2 is, in some embodiments, driven by the computing part 3.

The computing arrangement comprises a user interface 5. That user interface can be any suitable interface such as a keyboard and/or a user touch screen. In some embodiments, the user interface may comprise a mouse or other pointing device. In some embodiments, the user interface may be considered to be provided by the combination of user selectable options and/or user input fields displayed on the display and one or more user input devices (for example a keyboard, touch screen and/or pointing device).

As mentioned, the computing arrangement may be connected to a device 10. The device 10 may comprise an interface 14 to allow the device to be connected to the computing arrangement 1. The device 10 may comprise a computer processing part 11 with one or more processors 12 and one or more memories 13.

In some embodiments, the device 10 may be running a computer app and data about this computer app may be provided to the computing arrangement 1. In other embodiments, the computer app may be running on the computer arrangement itself.

The following embodiments are described by way of example only with reference to a computer app providing a computer game. However, it should be appreciated that other embodiments may be used with any other suitable computer program or app. Typically a computer app comprises computer code and in particular may have many lines of code. When an error occurs in one or more lines of the code, this may result in the computer program or app functioning incorrectly. The computer code thus needs to be debugged to remove the errors. The debugging is conventionally performed by reviewing the lines of code.

Some embodiments provide computer implemented device which is able to process the data provided by the running of the computer app and provide a user interface which allows the processed data to be navigated.

Some embodiments may provide a computer implemented device which is configured to provide for more effective debugging of computer code of a computer program or app.

Some embodiments may provide a computer implemented device which is configured to provide improved testing of a computer code of a computer program.

Some embodiments may provide a computer implemented device which is configured to facilitate the modifying of computer code of a computer program.

In some embodiments, the computer app or program may comprise code which causes the computer app to output data as the code is run. The code which causes the computer app to output data may be provided or only activated in a version of the computer app which is being tested or debugged or modified.

In some embodiments, the output data may comprise data associated with frames generated by the computer app to be displayed on a display. A frame represents a still image which the computer app generates to be displayed on a display when the app is being run. The data associated with a frame may comprise one or more event logs and/or other data logs. The computer app may have a frame rate. The frame rate may be any suitable frame rate. The frame rate may be dependent on the app. The frame rate may be dependent on the hardware and/or software that may run the app when the app is deployed. In some embodiments, the frame rate may be 60 frames a second (60f/s). However, in other embodiments, the frame rate may be higher or lower than this value. It should be appreciated that the same image may be displayed for more than one frame and/or the image which is displayed may change from frame to frame.

In, the output data may comprise one or more event logs and/or other data logs.

A given event or data log may be associated with time information such as a time stamp and/or frame number. In some embodiments, the frame may be associated with a time stamp and/or frame number and/or time range. The time range may have a start time and an end time. In some embodiments, the events are received. The events may have associated time information. Based on the associated time information, a determination may be made by the at least one processor as to the frame with which the respective event is associated.

In some embodiments, the at least one processor may be configured to process the output data.

The output data may be stored in memory in the computing arrangement. By way of example only, the data may be stored in the hard disk and/or other suitable data store.

The computer processing part may be configured to process the output data as will be described in more detail later.

In some embodiments, the computer app or computer program may have a node graph software architecture.

The computer arrangement of some embodiments may be configured to process the output data from the computer app to determine at least a part of a node graph from the output data. The computer arrangement may be configured to display a part of the node graph. The computer arrangement may be configured to control the user interface to allow the user to provide user input and in response to the user input allow the user to navigate through the node graph. This navigation may be through the node graph at a particular point in time or for a particular frame. Alternatively, the navigation may be through time, for example to show changes to one or more nodes. This navigation may be through different frames.

The processing of the data and the controlling of the user interface may facilitate the debugging and/or design and/or modification of a computer program such as a computer application or app.

Figure 2:
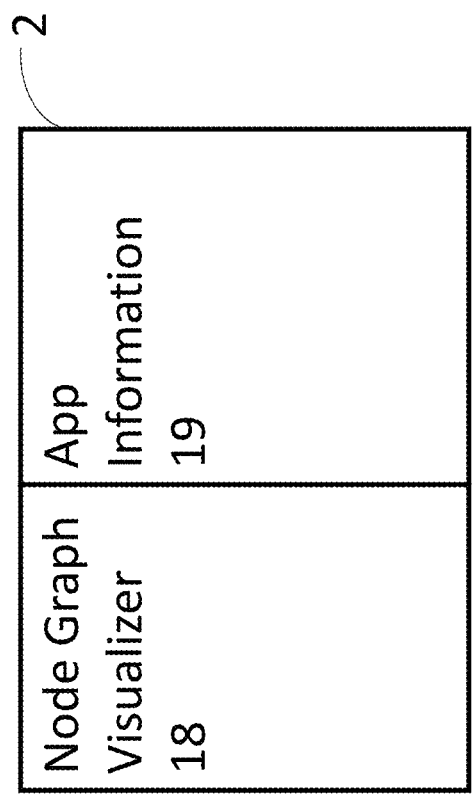
FIG. 2 schematically shows a screen provided by some embodiments.

Reference is made to FIG. 2 which shows a schematic view of the display 2. The display is configured to be controlled by the computing part. In this embodiment, the display 2 is controlled to display a first area 18 comprising a visualised node graph architecture for a part of the computer program and a second area 19 which provides information about the computer program or app.

The first area may also display user selectable options and/or user input fields. User input received via the user interface is provided to the at least one processor. This user input is received by the at least one processor and may be used to control navigation of the visualised node graph architecture or to control the part of the node graph which is visualised on the display. The at least processor may receive user input via the user interface selecting a part of the node graph architecture and in response will cause the display to display data associated with that part of the node graph. This is discussed in more detail later.

Some embodiments may for allow values or events to be tracked across different frames and/or through different nodes.

In this example, the display is controlled to display in the first area a visualization of a part of the node graph architecture and information about the computer program in the second area. This is by way of example only.

In other embodiments, the information provided in the first area and the second area may not be displayed on the display at the same time. For example, the user may be able to provide an input via the user interface to allow the user to select whether to view the node graph visualization or the app information on the display.

Visualization and navigation of the node graph architecture provided by the computer device allows for efficient debugging, modification and/or design of the computer program.

A node graph architecture is a computer software implemented architecture and may be considered to be made up a series of nodes which can be connected to form a node graph. A node may perform a specific task. A node may be connected to one or more other nodes. A node may receive data from another node and/or provide data to another node.

Thus, in FIG. 2, on the left side of the display is a visualization of a node graph generated by the at least one processor and the right side of the display information relating to the app which is running.

Figure 3:
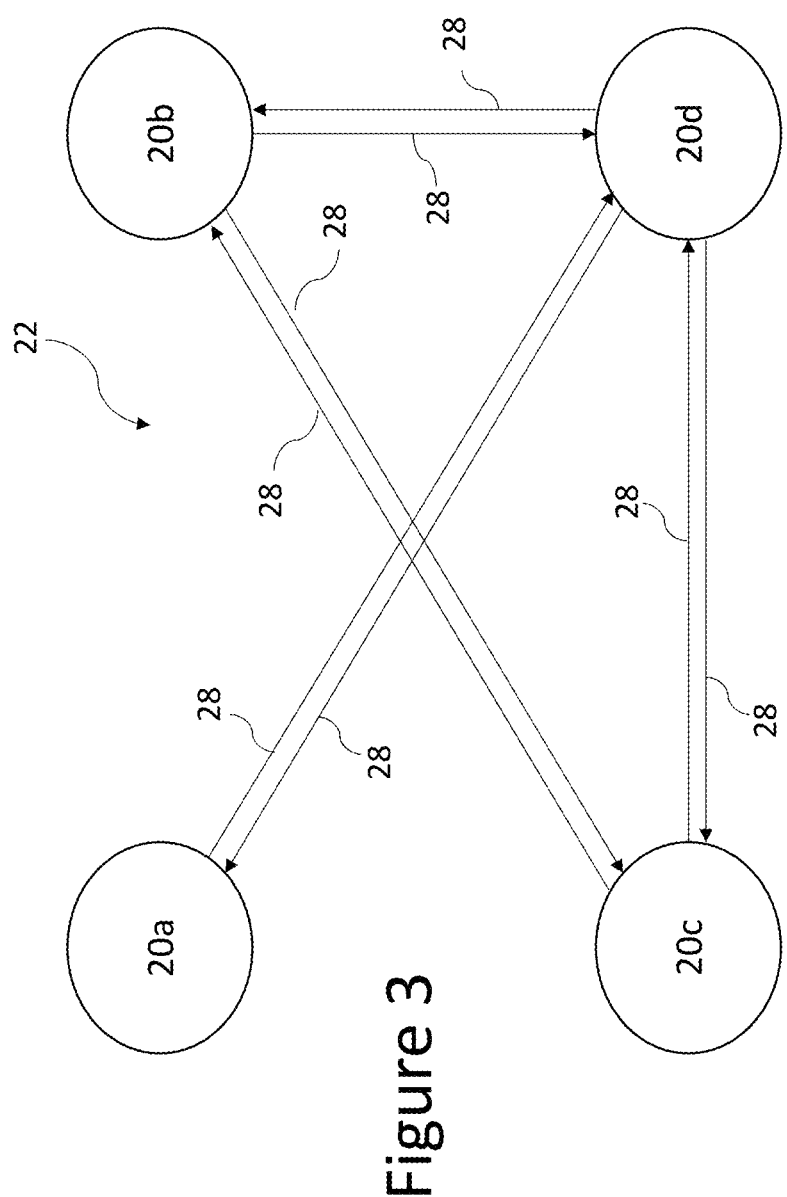
FIG. 3 shows a schematic representation of a node graph architecture.

Reference is made to FIG. 3 which schematically shows an example node graph architecture 22 which is determined by the at least one processor from the data output by the computer app. The at least one processor is configured to process the data and cause a visualization of a part of the node graph to be displayed on the display. The node graph architecture comprises a plurality of nodes or vertices. In the example shown in FIG. 3 there are four nodes or vertices 20*a*, 20*b*, 20*bc* and 20*d*.

A node is connected to one or more other nodes by a connection 28. A node may have one or more ports. The one or more ports may be used to connect to one or more ports of one or more other nodes. There may be more than one connection between nodes. Connections may be uni-directional in some embodiments. In other embodiments, one or more connections may alternatively or additionally be bidirectional. A connection may be used to transfer data from the port of one node to a port of another node. The data may be a value. The value may be a string, an integer, a Boolean value or any other suitable value. A node may perform instructions with respect to input data to provide output data. Some examples of nodes will be described in more detail later.

A node may contain code that will be executed when the node is triggered.

Figure 4:
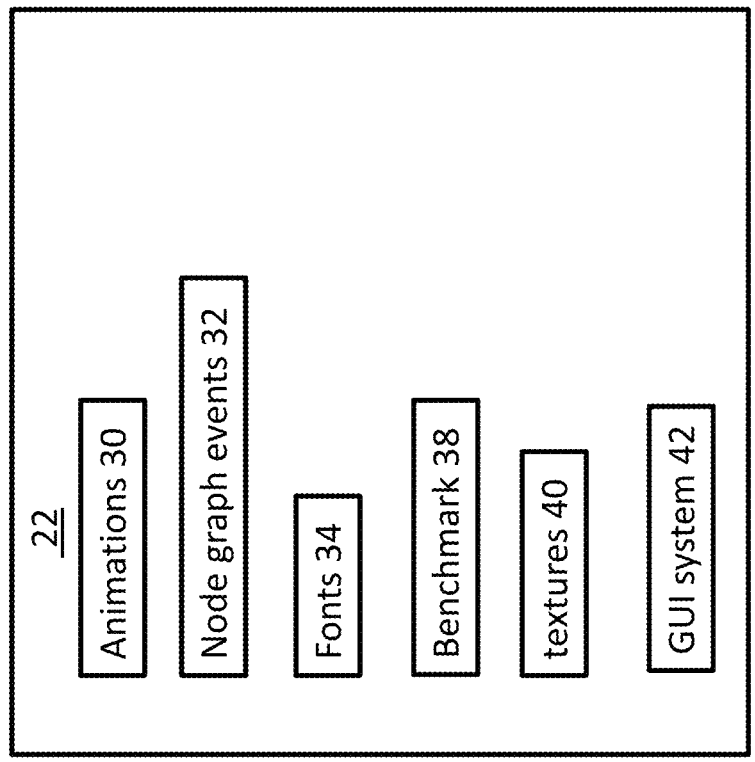
FIG. 4 shows schematically example information which is displayed about a computer app.

Reference is made to FIG. 4 which shows example of information which is displayed about the computer program in the second area 19. The information may comprise one or more options. An option is attached to an object to modify/add new behaviours to that object. The object may be an object in the game. For example, with a font option, there may be a default font, which could be changed by specifying a different font with the font option. Some embodiments allow the creating and adding of components (options) to modify a node in a desired way.

In one example embodiment where the computer app is a computer game, one or more of the following options may be provided:
  an animation option 30,
  a node graph event option 32,
  a fonts option 34,
  a benchmark option 38,
  a textures option 40, and
  a GUI (graphical user interface) system option 42.

The animations option is for controlling or providing of animations in the computer app.

The node graph event option is for listening to events from the node graph.

The fonts option is for controlling or providing of fonts in the computer app.

The benchmark option is for rendering "budgets" on the device. The "budget" is how much CPU/GPU/memory is available to execute and render a frame. It describes for example the available number of milliseconds, how much available memory and/or the like. On a slower device (on which the app will run), the budget is smaller, since the device cannot do as many operations as a faster device. It is useful to know how much time some operations take to make sure that the app is not too slow on a given device.

The textures option for controlling or providing of textures.

The GUI option is for controlling or providing various GUI options.

It should be appreciated that this is by way of example only and other embodiments may display more or less than the options displayed. The options shown on the display in the second area is by way of example only and one or more different options may alternatively or additionally be displayed. The number of options may be greater or smaller than the number of options than shown in FIG. 4. In some embodiments, the options may be displayed in a list through which the user is able to scroll by providing input via the user interface. In some embodiments a subset of one or more but not all options may be displayed at a given time. In some embodiments, all of the options may be displayed at the same time.

One or more of the options may be associated with a user selectable option. User input from the user interface may allow the option to be selected. When an option is selected, the at least one processor is configured to cause the display to display information about a currently selected value for a currently selected object (node). The user may be able to provide user input to select a different value. The computer app will be modified to use the updated value, for example a different font or the like.

In some embodiments, alternatively or additionally, the display may be controlled to display the images or frames generated by the computer app.

Figure 5:
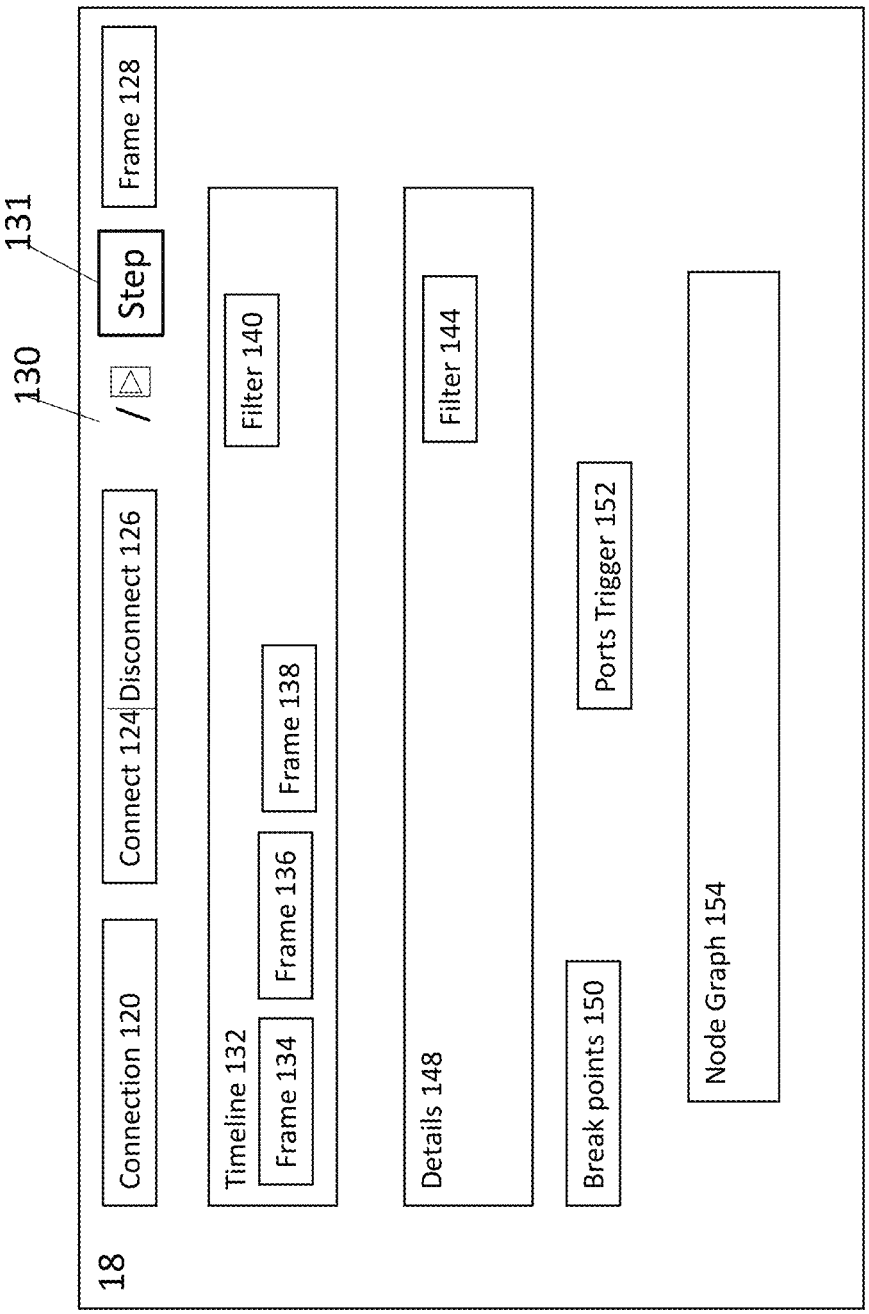
FIG. 5 schematically shows a user interface for selecting and displaying a part of a visualized node graph for a computer app.

Reference is made to FIG. 5 which schematically shows the node graph visualizer 18 provided by the at least one processor and which is caused to be displayed on the first area in more detail.

The node graph visualizer may be implemented by computer code or the like running on the at least one processor. The at least one processor is configured to cause the display to display one or more user selectable options which can be selected by user input received via the user interface and/or one or more user input fields which can receive input data, received via the user interface.

The at least one processor is configured to update the node graph visualizer. This may be in response to the user input. This updating of the node graph visualiser may be in conjunction with the processing of the data from the computer app which is running and outputting data. The node graph visualizer will generate at least a part of a node graph from at least a part of the output data of the computer app and cause an image of that node graph to be displayed on the display in the area of the display referenced 154.

It should be appreciated that one or more of the various user selectable options or fields shown in FIG. 5 may be omitted from the node graph visualizer in some embodiments. In some embodiments, one or more other user selectable options or fields may alternatively or additionally be displayed on the display in some embodiments.

In some embodiments, different ones of the described user selectable options and/or fields may be displayed on the display at different times. A subset of one or more of the user selectable options and/or fields may be displayed at a given time on the display in some embodiments.

The layout of the various options of the node graph visualizer is by way of example only and different layouts may be provided in different embodiments.

In some embodiments, the node graph visualizer is provided with a connection address field 120 which allows the user to input a connection address via the user interface. In other embodiments, there may be a default address to which the node graph visualizer is connected. This may be for example to connect to the device 10 which is running the app or any other host on which the app is being run.

In some embodiments, the node graph visualizer is provided with a connect option 124 and/or a disconnect option 126. For example, the user can provide user input via the user interface to select the connect option. In response to this input, the at least one processor may be configured to cause a connection to a local host to be established. The local host may be a host on which the app is being run. The user may provide via the user interface an input comprising the local host IP address which is input into the connection address field. The user input received via the user input may then select the connect option. The at least one processor will, in response to the selection of the connect option cause the computing arrangement to be connected to the host on which the app is run. This will cause the app to run and to provide the data output which is processed by the at least one processor.

The user can select the disconnect option via the user interface. In response to this selection, the at least one processor is configured to cause the computing arrangement to be disconnected from the host on which the app is being run.

A frame field 128 may be displayed on the display. The at least one processor is configured to cause the current frame number of the computer app which is being run to be displayed.

A pause/play option 130 may be provided. When this option is selected by user input received via the user interface, the at least one processor is configured to cause an output to be provided to the host on which the computer app is being run. This output will cause the host to pause the running computer app or to restart the computer app after it has been paused.

A step option 131 may be provided in some embodiments. Once the app is paused, if this option is selected by user input received via the user interface, the at least one processor is configured to provide an output to the host which causes the app to be executed one frame at a time. Thus, the paused app will be restarted to run and provide a next frame of data before the app pauses again. This may be as an alternative to simply restarting the execution of the app with the play option. In some embodiments, the stepping may be through the stored output data, which has been processed by the at least one processor. The data which is stored may be before it is processed by the processor or after it has been processed.

In some embodiments, the at least one processor is configured to cause the display to display a timeline area 132. In this area, up to n frames may be displayed. The number of frames displayed may be dependent on the size of the available area. In this example three frames 134, 136 and 138 are displayed. However, this is by way of example only and more or less than three frames may be displayed in other embodiments.

In some embodiments, a number of events associated with a given frame may be displayed in association with the frame. In some embodiments, this may be displayed within the area associated with a respective frame. Alternatively or additionally this may be displayed outside, but adjacent to, the area associated with the respective frame. The events may be identified in any suitable manner. For example, in some embodiments, an event may be indicated by a number.

In some embodiments, a number of a given frame may be displayed in association with the frame. In some embodiments, this may be displayed within the area associated with a respective frame. Alternatively or additionally this may be displayed outside, but adjacent to, the area associated with the respective frame.

In some embodiments, if a user uses an input device and hovers a cursor over a frame, the at least one processor may be configured to cause the display to display one or more of the frame number and the number of events in that frame.

In some embodiments, the at least one processor is configured to cause the display to display a details area 148. This will area display a list of events. This may be dependent on the user input received via the user interface. In some embodiments, this area may be automatically populated based on one or more criteria For example, for a given frame, the at least one processor is configured to cause the display to display events associated with that frame. The events may for example be displayed in a list. The frame may be selected by user input received via the user interface or otherwise selected.

By way of example only, one or more of the following event fields may be displayed for each event:
the frame number in which the event occurred;
the name of the event;
the entity name;
the entity ID;
the port name;
the port ID;
the source entity name;
the source entity ID;
the destination entity name;
the destination entity ID;
the source port name;
the source port ID;
the destination port name;
the destination port ID;
the port type; and
the port value.

A timeline filter 140 may be set by the at least one processor. This may be in response to input received via the user interface. The user may be able to, via the user interface, input a value for the filter which is not limited to a particular event field. Alternatively or additionally, the filtering of the events may be for one or more of the event fields having a particular value.

In some embodiments, one or more filters may be selected and in response the at least one processor may be configured to cause one or more frames having one or more events satisfying the filter to be listed in the timeline area. For example, a particular filter value is present in frame 57, 62 and 65. Accordingly only those frames are displayed in the timeline. The user can then provide user input to select one or more of those frames. In response to the user input, the at least one processor is configured to cause the display to display a list of events of that frame.

In some embodiments, all of the events, regardless of the frame, may be displayed in the list in the details area.

In some embodiments, a details filter 144 may be set. This allows the user to provide an input via the user interface which cause the processor to apply a filter to the list of events which is displayed in the details area 148. The user may be able to enter a value for the filter which is not limited to a particular event field. Alternatively or additionally, the filtering of the events by the at least one processor may be for one or more of the event fields having a particular value. In some embodiments, one or more filters may be selected and the at least one processor is configured to cause the display to display one or more events satisfying the filter listed in the details area. A filter can be applied to a selected frame or set of events.

If the list is not able to be displayed in its entirety, then the user may be able to scroll through the list via the user interface.

In some embodiments, the at least one processor is configured to cause the display to display a node graph area 154. In dependence on one or more selected events, one or more node graphs will be displayed in this area.

In some embodiments, the node graph visualizer is provided with a breakpoint area 150. This allows one or more breakpoints to be set. The user may input a breakpoint value via the user interface. In some embodiments, a breakpoint may be set by the at least one processor. A breakpoint can be set for a particular port. This may be for any change associated with the port or for a particular value on the port. This causes the host to set up an observer for the app to determine when, for example the particular value occurs on the port. When the at least one breakpoint condition occurs, the host is configured to cause the pausing of the computer app. Code within the computer app may be invoked to set up the breakpoint observer and cause the pausing of the computer app when the breakpoint occurs. The trigger for the breakpoint will depend on the selected entity and the selected port of the selected entity. In some embodiments, there will be a breakpoint when there is a change on the selected port of the selected entity. In some embodiments, the breakpoint can be set for a particular value on the port. When a change is triggered on the selected port in the running of the app, then the breakpoint will be triggered.

In some embodiments, the node graph visualizer is provided with a port trigger area 152 which allows one or more triggers to be set for a port by the at least one processor. This may be in response to user input via the user input. In some embodiments the user can input a value which the at least one processor can cause to be inserted by the host running the app into a particular port of a particular entity of the app. The ports trigger option 152 allows the selection of one or more of the entity and associated port. The user is able to provide the required value into a value field via the user interface. This can be triggered by the user providing input via the user interface to the trigger option.

When the connect option 124 is selected, frames start to appear in the timeline area 132 of the display. The frames may appear in the timeline in "real time" as they are generated.

For each frame the number of events associated with each frame is displayed on the display.

A user is able to select by providing user input to the user interface one or more of the frames. In response, the at least one processor is configured to cause the events associated with that selected one or more frames to be displayed. The user is able to select one or more of the events by providing user input to the user interface. The events represent the construction of a node graph. If the user selects a different frame in the timeline, the events for that different frame will then be displayed in the details area of the display.

In some embodiments, the display may be controlled to display a history of the node graph over time.

Some embodiments may allow the user to provide user input via the user interface with respect to the node graph. This user input is received by the at least one processor which is configured to control the display to show for example jumps from one node to another. For example, this may be achieved by user input providing a click or the like via the user interface associated with a node displayed in the node graph. This may allow a user to see a connection tree provided by the node graph and displayed on the display. The display may be controlled such that the user is able trace how a value was changed in the node graph.

The user interface may be configured to receive a user input to select one or more frames of the timeline and in response, the at least one processor may be configured to determine a node graph for one or more events associated with the selected one or more frames of the timeline. There may be a default selection of the one or more events for the generation of the node graph.

The visualization of the node graph provided by the computer arrangement of embodiments may allow the user to debug node graph software (the app) that was built using a node graph editor.

A node graph, when it is executed, will run computer code that is represented by nodes in the graph. A user may not normally not see that code directly.

However, in some cases, a user can create a component such as a LUA component. This may allow a user to add code to be executed in the node graph. Although a user cannot look at the execution of the LUA code, the user use will be able to see that the LUA code was executed.

Figure 6:
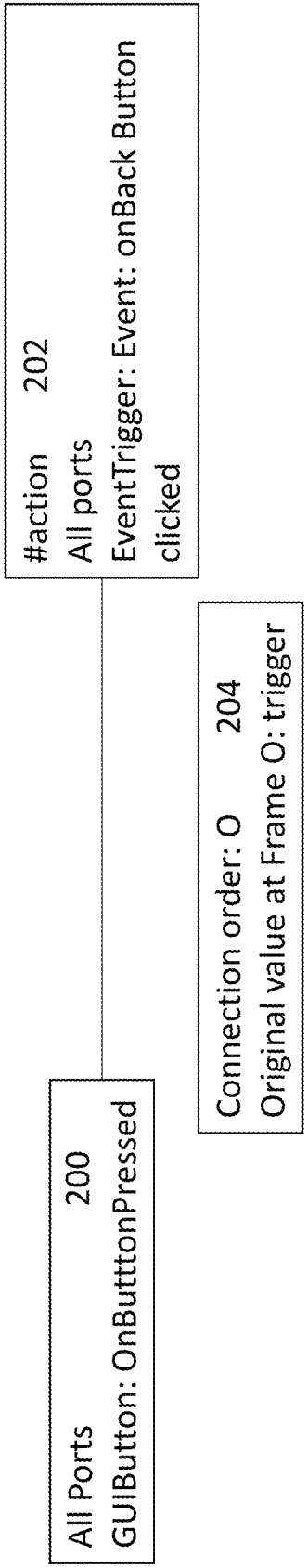
FIG. 6 schematically shows a first node graph.

Reference is made to FIG. 6 which shows an example of a node graph for the first event. When the user selects an event, the at least one processor is configured to cause a node graph for that event to be displayed in the node graph area. The event in this example is that a port is added. The entity name is #action and the node is referenced 202 in FIG. 6. The entity is the object in the game. The node is its representation in the node graph. The entity ID in this example is 50. The port name in this example is EventTrigger:Event:OnBackButtonClicked. In the computer app, a back button has been clicked. This port may be associated with the port ID 1.

As can be seen the node 202 is connected to node 200 via a connection 204. The node 200 has the entity name home. The node 200 has a port which in this example is called GUIButtton:OnButton pressed.

The at least one processor may be configured to cause information about the connection 204 to be displayed. In some embodiments, the information about the connection is only displayed if a cursor is hovered over the connection. In this example, connection order information is displayed. This may be used where there is more than one connection at a port and the connection will give the order of the connections. In this example the connection order is 0. The original value at the current frame may be given. In this example the frame number is 0 and the original value at frame 0 is trigger.

In some embodiments, double-clicking on the connection will cause the at least one processor to cause the display of a new window with the connection value history. This may be a floating window. This window may stay open until it is closed by the user, so the user can explore other part of the graph and keep the value history for a connection that is not displayed anymore. This will be described in more detail later.

It should be appreciated that in some embodiments, the at least one processor may be configured to cause the node associated with the event to be displayed in a visually distinct manner and/or otherwise indicated so that it is clear as to which node is associated with event. The nodes which are connected to the node associated with the event may be displayed differently and/or otherwise indicate that they are not the node associated with the event but are connected to the node associated with the event.

Figure 7:
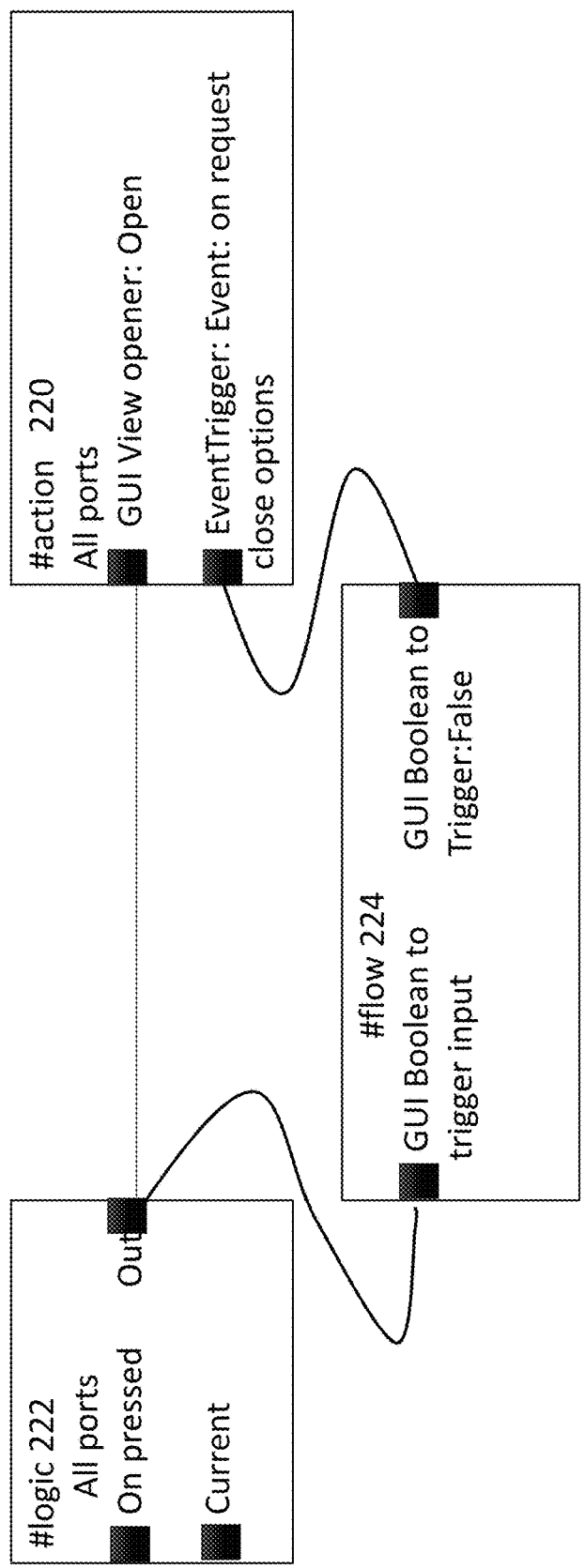
FIG. 7 schematically shows a second node graph.

Reference is made to FIG. 7 which shows a node graph for a different event. This event is an event of a port being added. The entity name is #action and is referenced 220. The entity has a first port with a port name GUI view opener: Open. The entity has a second port with a port name of EventTrigger: Event:on request close options.

The #action entity 220 is connected to a first entity 222 called #logic and a second entity 224 called #flow.

The first entity 222 has a first port called Out which connects to the first port entity 220.

The first entity has a second port called On pressed and a third port called Current. The nodes to which these ports are connected are not shown.

The second entity 223 has a first port called GUI Boolean to trigger:False which is connected to the second port of the event node. The second entity has a second port GUI Boolean port to trigger input. This second port of the second entity is connected to the first port of the first entity.

It should be appreciated that the first port of the first entity has two connections. Accordingly, there may be a connection order associated with the port which indicates an order of one connection with respect to the other.

In some embodiments, the at least one processor will cause the display of a node graph which shows the node of the event and any other node which has a connection to the node of the event. In some embodiments, nodes connected to the nodes connected to the node of the event may not be shown. In other embodiments, nodes which are indirectly connected to the node of the event may be shown provided they are N or less hops from the node of the event. N is an integer which is 1 or more.

It should be appreciated that the timeline filter can then be used to see all the changes on a port, for example including the breakpoint and/or the triggered port.

Figure 8:
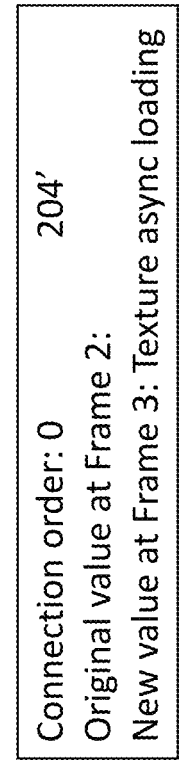
FIG. 8 schematically shows connection information for a connection between two.

Reference is made to FIG. 8. In some embodiments, the connection value history may be shown in a tooltip or the like when a cursor is over a connection. This is displayed in a pop up when the cursor is over the connection and is closed when the cursor moves from the connection. In other embodiments, the window may persist until closed.

The connection order may be provided in the pop up. The frame at which the original value is provided may also be shown along with one or more frames at which a new value is provided. The new value and/or the original value may be provided in the tooltip.

In some embodiments, the user can select the connection value history to be displayed in a floating window which is displayed until the user closes that window. This window may be positioned by the user on the display. The user may have a plurality of these windows open at the same time. This allows the user to for example to compare the connection history for a given entity over the course of time and or the like.

Figure 9A:
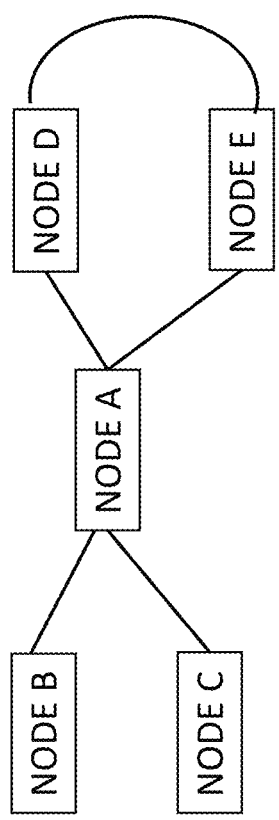
FIG. 9a schematically shows a third node graph.

Reference is made to FIG. 9a which shows a schematic view of a node graph which is displayed in the node graph area 154. The entity for which the event has been selected is Node A. This node graph will show all the nodes that are connected to Node A directly. The node graph will not show any nodes which are not directly connected to Node A. In this example Node A has a first port connected to Node B and to Node C. As there are two connections associated with this first port, the connections may be associated with a connection order. Node A has a second port connected to a first port of Node D and a first port of Node E. As there are two connections associated with this second port, the connections may be associated with a connection order. A second port of node D is connected to a second port of Node E.

In some embodiments the node graph is completely evaluated in the same frame. In that case, data would go from B→A→D and E in the same frame. However, in some embodiments, one or more node may be configured to delay the propagation of the data by one or more frames.

Figure 9B:
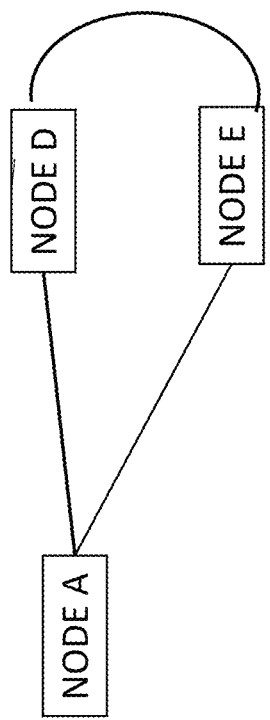
FIG. 9b schematically shows a node graph displayed when one of the nodes of the node graph of FIG. 9a is selected.

In some embodiments, a user is able to select any of the nodes in that node graph and the at least one processor is configured to cause the node graph for that selected node to be displayed. The node may be selected in any suitable way. For example, the user may via the user interface "double click" on the node to be selected. For example, as shown in FIG. 9b, Node D has been selected. The nodes which are directly connected to Node D will be shown. Thus, the nodes that Node D are connected to are shown, that is nodes A and E. Nodes B and C are not shown. If Node D was connected to a further node, this may optionally be displayed in some embodiments.

It should be appreciated that the details part of the node graph visualizer will comprise details associated with the selected node, that is Node D in the example of FIG. 9b. If there are no events associated with the node in the current frame, details from a previous frame associated with that node may be displayed.

Figure 10:
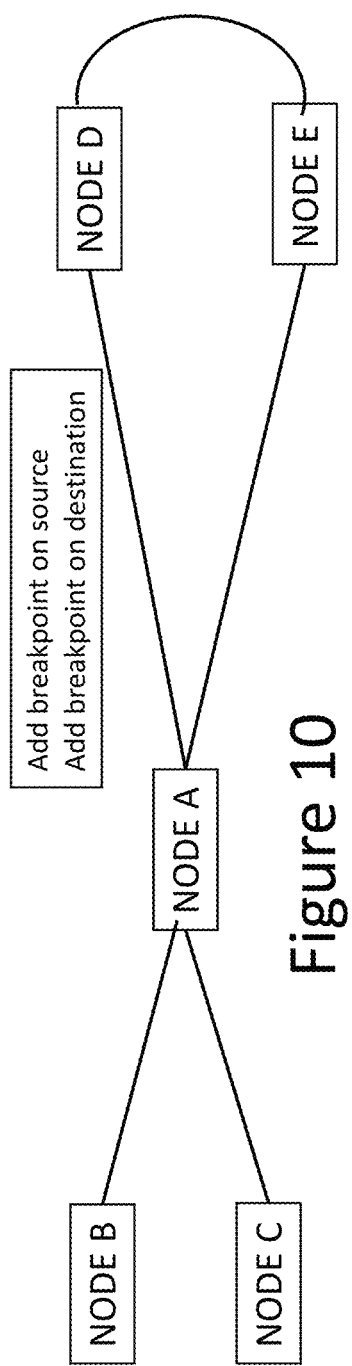

In some embodiments, it may be possible to add a breakpoint directly in the node graph view. For example, as shown in FIG. 10, it is possible to receive input from a user to provide an option for a particular port to add a breakpoint either on the source or destination. A right-click on the connection by the user via the user interface allows a user to add a breakpoint (in the breakpoint section of the tool) and to push new data (in the trigger section of the tool). A double-click on the connection by the user via the user interface will display a window with the connection value history such as described previously.

Figure 12:
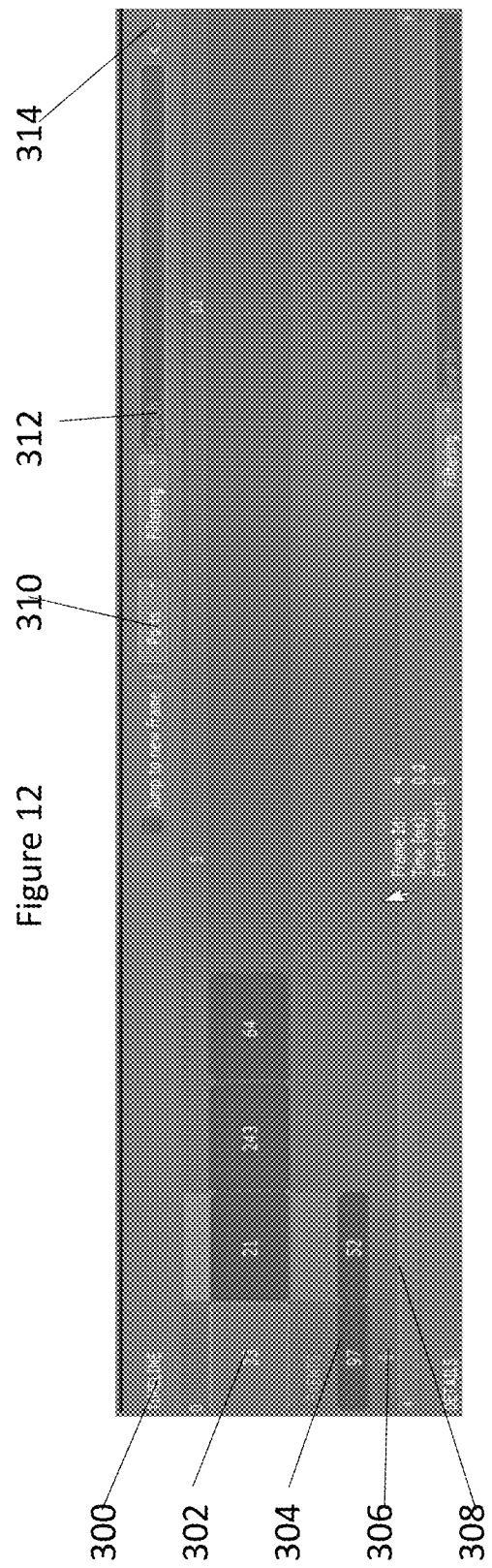
FIG. 12 shows a timeline of some embodiments.

Reference is made to FIG. 12 which shows another example of a timeline area 300. In this embodiment, up to n frames may be displayed in the area. For each frame, one or more of the number of port changes 302, the number of events 304 and the number of data changes 306 for a given frame is displayed in the timeline. An event is where something occurs. This may for example be that a port is added, a button is pressed in the game or any other suitable event. The ports will be the number of ports that have been added and/or changed and/or the like in a given frame. The data change is where new data is set for example to propagate a value in the game. In the example of FIG. 12, all of the number of ports 302, the number of events 304 and the data 306 for a given frame is displayed.

In some embodiments, a categorization may be provided for each frame. The categorisation may be based on the time associated with a frame. In some embodiments, if the processing time associated with a frame is relatively high, this may be indicative of a problem with the code which generated that frame. The processing time is the time taken to process for example events associated with a frame. This may indicate that there may be an issue with the providing of a particular frame at the defined frame rate. In some embodiments, there may be two or more categories with the band associated with the category associated with one or more of a lower or upper threshold. For example, a first category may have an upper threshold of x, the second category may have a lower threshold of greater than x and an upper threshold of y and a third category may have a lower threshold of greater than y. There may of course be more or less than three categories. In some embodiments, one or more of the categories may be displayed in a visually distinct manner. Colour coding may be associated with one or more of the categories. In some embodiments, one or more of the thresholds may be set by the user.

In some embodiments, the processing time for a frame may alternatively or additionally be displayed. This may be on the timeline or in response to user input. For example, the processing time may be displayed when a user causes the cursor to hover over the frame or in any other suitable manner.

The processing time associated with a frame may be determined by the at least one processor.

In this embodiment, the user is able to select via option 310 whether to filter based on ports, events or data or without any limitation as to ports, events or data. In field 312, the user is able to insert the filter value. Navigation arrows 314 allow the user to navigate between the frames which satisfy the filter criteria.

In some embodiments, a scroll bar 308 is provided to allow the user to scroll through the frames.

In some embodiments, the number of frames which can be displayed at the same time may be controlled by a zooming function. There may be a minimum number of frames which are capable of being displayed and/or a maximum number of frames which are capable of being displayed.

Figure 11:
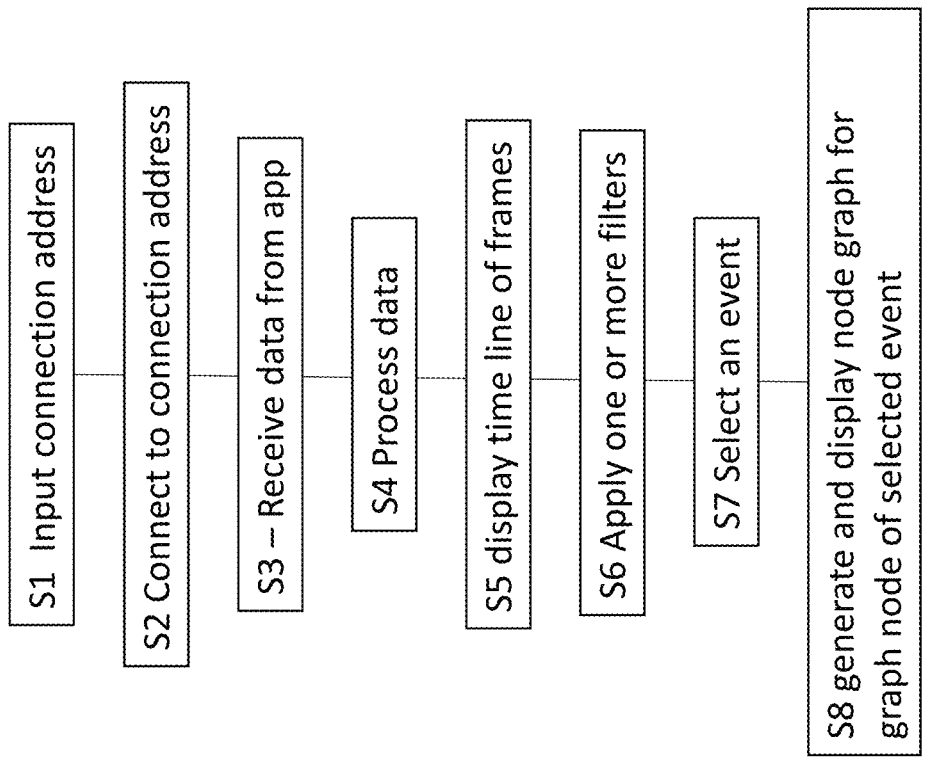
FIG. 11 schematically shows a method of some embodiments.

Reference is made to FIG. 11 which shows a method of some embodiments.

In step S1, a connection address is input via the user interface. The connection address may be input to the connection address field In step S2, the at least one processor is configured to connect to the connection address. This will connect to the host device on which the app is run and cause the app to start.

In step S3, the computer app runs and outputs the frame data which is generated as the app runs.

In step S4, the at least one processor is configured to process the data. The data may be stored in a data store before and/or after the data is processed. The data is processed to provide data about a series of frames of data. The data may be processed to provide information about one or more of the ports, events and data such as previously discussed. The data processing may comprise determining the number of events, number of ports that have been added and/or changed and/or the number of data changes.

In step S5, a timeline of frame data is displayed on the display.

Optionally in step S6, the user interface is configured to receive an input provided by the user selecting one or more filters to be applied to the data. The at least one processor is configured to apply the one or more filters to the data.

Optionally the user may alternatively or additionally provide an input to select a frame.

When a frame is selected, one or more events for that frame may be displayed on the display. A series of frames of events generated by the computer app are received and processed by the at least one processor to provide a node graph and/or the data to be displayed on the display.

In step S7, the user selects one or more events via the user interface.

In step S8, the at least one processor is configured to generate and display a node graph for the selected one or more events for the given frame.

Other embodiments may be such that the computer app or computer program may not have a node graph architecture. In these embodiments, the at least one processor may be configured to process to the data to generate the node graph. This may require one or more of filtering the output data and modifying the output data.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

Various methods and devices have been described. It should be appreciated that these methods may be implemented in apparatus or devices comprising any suitable circuitry. Some embodiments may be implemented by at least one memory and at least one processor.

The memory is provided by memory circuitry and/or the processor is provided by processor circuitry. Some embodiments may be provided by a computer program running on the at least one processor. The computer program may comprise computer implemented instructions which are stored in the at least one memory and which may be run on the at least one processor.

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network.

In general, the various embodiments may be implemented in hardware or special purpose circuits, software, logic or any combination thereof.

Embodiments may thus be practiced in various components such as integrated circuit modules.

It is also noted herein that while the above describes embodiments of the invention, there are several variations and modifications which may be made to the disclosed solution without departing from the scope of the present invention.

The invention claimed is:

1. A computer device comprising:
   at least one processor configured to process frame data for a plurality of frames provided by running of a computer app, the frame data comprising a plurality of events occurring in the computer app;
   a display configured to display information associated with one or more frames of the plurality of frames; and
   a user interface configured to receive input from a user;
   the at least one processor being configured to:
      determine a node graph, in response to the input from the user, for one or more events associated with one or more of the one or more frames from the frame data; and
      cause the display to display the determined node graph associated with the one or more events;
   wherein the user interface is configured to receive user input setting one or more filters and the at least one processor is configured to process the frame data in dependence on the one or more filters to cause the display to display data satisfying the one or more filters.

2. The computer device as claimed in claim 1, wherein the user interface is configured to receive the input from the user selecting the one or more events for which the node graph is determined.

3. The computer device as claimed in claim 1, comprising a data input configured to receive the frame data provided by the computer app as the computer app is running.

4. The computer device as claimed in claim 1, comprising at least one memory configured to store at least a part of the frame data provided by the computer app.

5. The computer device as claimed in claim 1, wherein the node graph comprises a first node associated with one of the one or more events and one or more further nodes which are connected to the first node.

6. The computer device as claimed in claim 5, wherein the user interface is configured to receive user input associated with a connection between the first node and a further node which is connected to the first node and in response the at least one processor is configured to cause information about the connection to be displayed on the display.

7. The computer device as claimed in claim 6, wherein the at least one processor is configured to determine history information associated with the connection, the information about the connection comprising the determined history information.

8. The computer device as claimed in claim 1, wherein the one or more filters comprise one or more event filters and the data satisfying the one or more event filters displayed on the display comprises information about one or more of: events satisfying the one or more event filters or one or more frames containing events satisfying the one or more event filters.

9. The computer device as claimed in claim 1, wherein the at least one processor is configured to cause the display to display a timeline of the one or more frames.

10. The computer device as claimed in claim 9, wherein the user interface is configured to receive a user input to select one or more of the one or more frames and in response, the at least one processor is configured to cause the display to display information about one or more events associated with the selected one or more frames.

11. The computer device as claimed in claim 9, wherein the user interface is configured to receive a user input to select one or more frames of the timeline and in response, the at least one processor is configured to determine the node graph for the one or more events associated with the selected one or more frames of the timeline.

12. The computer device as claim in claim 9, comprising a data input configured to receive the frame data provided by the computer app as the computer app is running, and the at least one processor is configured to update the timeline as the data provided by the computer app is received and to cause the display to display the updated timeline.

13. The computer device as claimed in claim 9, wherein the at least one processor is configured to process the frame data in dependence on the one or more filters to cause the display to display in the timeline, one or more frames satisfying the one or more filters.

14. The computer device as claimed in claim 9, wherein the at least one processor is configured to determine data for a respective frame and cause the display to display the data in association with the respective frame in the timeline.

15. The computer device as claimed in claim 14, wherein the determining the data for a respective frame comprises processing time data for that respective frame.

16. The computer device as claimed in claim 14, wherein the data determined for a respective frame comprises one or more of number of port changes for the respective frame, number of events for the respective frame and number of data changes for the respective frame.

17. The computer device as claimed in claim 1, wherein the user interface is configured to receive user input providing breakpoint data, the at least one processor is configured to provide an output which causes a breakpoint condition to be set for the computer app, wherein when the breakpoint is satisfied, the computer app will pause.

18. The computer device as claimed in claim 1, wherein the user interface is configured to receive user input defining a value for a first port of a first entity, the at least one processor being configured in response to provide an output which causes the value to be inserted into the first port of the first entity of the computer app.

19. The computer device as claimed in claim 1, wherein the user interface is configured to receive an input to connect to a host on which the computer app is run and in response the at least one processor is configured to provide an output to the host to cause the computer app to run.

20. The computer device as claimed in claim 1, wherein the user interface is configured to receive an input to pause the computer app and in response the at least one processor is configured to cause an output to be provided to a host on which the computer app is run to cause the computer app to be paused.

21. A computer method performed by a computer device comprising:
processing frame data, by at least one processor of the computer device, for a plurality of frames provided by running of a computer app, the frame data comprising a plurality of events occurring in the computer app;
displaying, by a display of the computer device, information associated with one or more frames of the plurality of frames;
receiving, by a user interface of the computer device, input from a user;
determining, by the at least one processor, a node graph, in response to the input from the user, for one or more events associated with one or more of the one or more frames from the frame data; and
causing, by the at least one processor, the display to display the determined node graph associated with the one or more events,
wherein the method comprises receiving user input setting one or more filters and processing, by the at least one processor, the frame data in dependence on the one or more filters to cause the display to display data satisfying the one or more filters.

22. A non-transitory computer readable storage device storing instructions that, when executed by at least one processor of a computer device causes said at least one processor to perform the following steps:
process frame data for a plurality of frames provided by running of a computer app, the frame data comprising a plurality of events occurring in the computer app;
cause displaying, by a display of the computer device, information associated with one or more frames of the plurality of frames;
determine a node graph, in response to input from a user via a user interface of the computer device, for one or more events associated with one or more of the one or more frames from the frame data; and
cause the display to display the determined node graph associated with the one or more events;
wherein the steps comprise receiving user input setting one or more filters and processing, by the at least one processor, the frame data in dependence on the one or more filters to cause the display to display data satisfying the one or more filters.

23. A computer device comprising:
at least one processor configured to process frame data for a plurality of frames provided by running of a computer app, the frame data comprising a plurality of events occurring in the computer app;
a display configured to display information associated with one or more frames of the plurality of frames; and
a user interface configured to receive input from a user;
the at least one processor being configured to:
determine a node graph, in response to the input from the user, for one or more events associated with one or more of the one or more frames from the frame data; and
cause the display to display the determined node graph associated with the one or more events,
wherein the at least one processor is further configured to;
cause the display to display a timeline of the one or more frames
determine data for a respective frame by processing time data for that respective frame; and
cause the display to display the data in association with the respective frame in the timeline.

24. A computer device comprising:
at least one processor configured to process frame data for a plurality of frames provided by running of a computer app, the frame data comprising a plurality of events occurring in the computer app;
a display configured to display information associated with one or more frames of the plurality of frames; and
a user interface configured to receive input from a user;
the at least one processor being configured to:
determine a node graph, in response to the input from the user, for one or more events associated with one or more of the one or more frames from the frame data; and
cause the display to display the determined node graph associated with the one or more events, wherein the user interface is configured to receive user input providing breakpoint data, the at least one processor is configured to provide an output which causes a breakpoint condition to be set for the computer app, wherein when the breakpoint is satisfied, the computer app will pause.

25. A computer device comprising:
at least one processor configured to process frame data for a plurality of frames provided by running of a computer app, the frame data comprising a plurality of events occurring in the computer app;
a display configured to display information associated with one or more frames of the plurality of frames; and
a user interface configured to receive input from a user;
the at least one processor being configured to:
  determine a node graph, in response to the input from the user, for one or more events associated with one or more of the one or more frames from the frame data; and
  cause the display to display the determined node graph associated with the one or more events,
wherein the user interface is configured to receive an input to pause the computer app and in response the at least one processor is configured to cause an output to be provided to a host on which the computer app is run to cause the computer app to be paused.

26. The computer device as claimed in claim 24, wherein the breakpoint data defines at least one of an entity of the computer app and a port of the entity of the computer app.

27. The computer device as claimed in claim 25, wherein while the computer app is paused, the user interface is configured to receive a step frame input, and in response to the step frame input, the at least one processor is configured to provide an output to the host which causes the computer app to run to provide data for a next frame before pausing again.

* * * * *